Patented Oct. 10, 1944

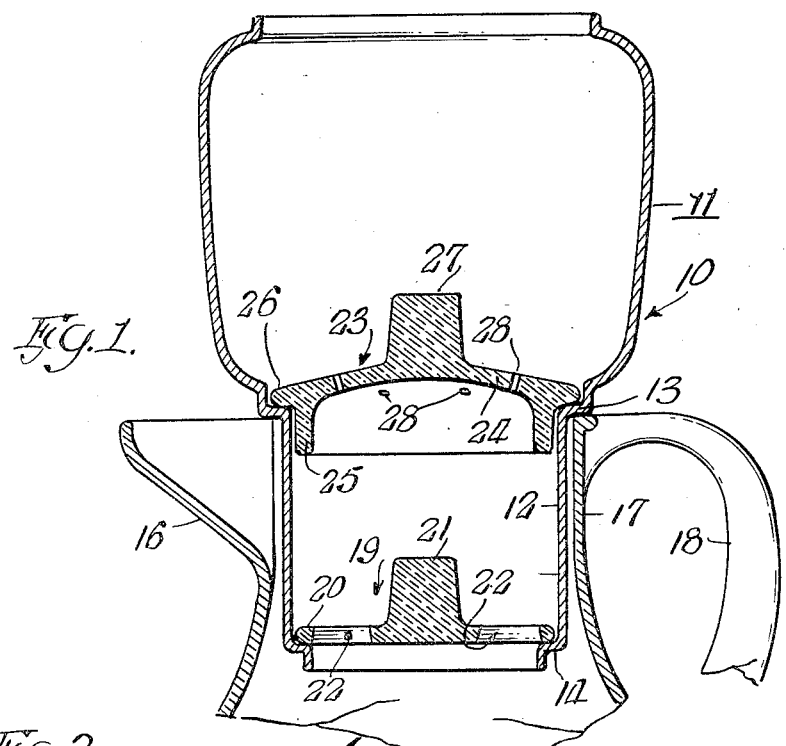
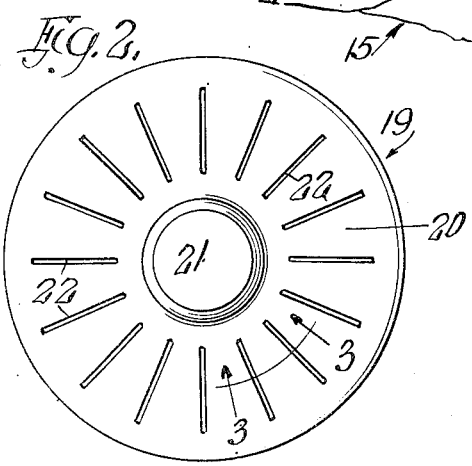
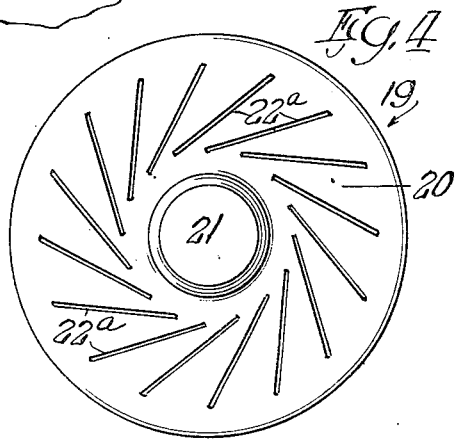
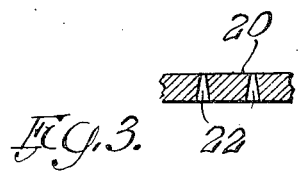

2,359,936

UNITED STATES PATENT OFFICE 2,359,936

DRIP COFFEE MAKER

Amos Peterson, Berwyn, Ill., assignor to Club Aluminum Products Co., Chicago, Ill., a corporation of Delaware Application August 31, 1942, Serial No. 456,788

5 Claims. (Cl. 99—306)

This invention relates to improvements in drip coffee makers and it consists of the matters hereinafter described and more particularly pointed out in the appended claims.

One of the objects of the invention is to provide a structure for use in drip coffee makers, which is of a simple construction and is made of a tasteless, odorless and nonabsorbent material which may be thoroughly and easily cleaned and sterilized without damage.

Also, it is an object of the invention to provide a structure for use in drip coffee makers that includes a filter disc having openings therein for the passage of the coffee infusion therethrough, and which openings are so formed that they will not readily clog with ground coffee grains.

Again, it is an object of the invention to provide a filter disc for drip coffee makers, including a body portion with slit-like openings therein which are so formed at the bottom as to overcome capillary attraction so that drops of coffee infusion will not hang or adhere to the bottom of the openings, but will pass or drain freely therethrough.

The above mentioned objects of the invention, as well as others, together with the advantages thereof, will more fully appear as the specification proceeds.

In the drawing:

Fig. 1 is a vertical sectional view through the upper portion of a drip coffee maker, embodying the preferred form of the invention.

Fig 2 is a top plan view of the filter disc of the coffee maker on a scale enlarged over that of Fig. 1 and shows one arrangement of the elongated openings in the body thereof, which may be advantageously employed.

Fig. 3 is a detail vertical sectional view through a part of the body of the filter disc appearing in Fig. 2 as taken on the line 3—3 thereof.

Fig. 4 is a view similar to Fig. 3 and illustrates another arrangement of the elongated openings in the filter disc, which may be advantageously employed.

The improved drip coffee maker, as shown in Fig. 1 includes a tubular body 10 made to provide an upper hot water receiving chamber 11 of the desired diameter and a lower ground coffee receiving chamber 12 of a smaller diameter, said chambers joining each other at an annular shoulder 13. The chamber 11 has an open top end that may be closed by a cover, not shown. The chamber 12 has an open bottom end that is formed with an inwardly extending flange 14. The body thus far mentioned is adapted for association with a coffee infusion receiving vessel 15, which in Fig. 1 appears as a conventional coffee server, having a spout 16 at one side of its neck 17 and a handle 18 on the other side of said neck.

When the tubular body 10 is operatively associated with the server 15, it rests with its flange 13 removably engaged upon the top end of the neck 17 thereof and with the ground coffee receiving chamber disposed within said neck as appears in Fig. 1.

The open bottom end of the coffee compartment 12 is normally closed by a removable filter disc 19 made as a unitary structure from a tasteless and odorless, non-absorbent material, such as glass or ceramic material that may be glazed in any suitable color. The filter disc includes a disc like body 20 of a diameter approximating that of the inside of the chamber 12 so that its peripheral margin has supporting engagement upon the flange 14. On the upper side of the body is a centrally disposed knob 21 adapted to be grasped by the fingers when applying or removing the disc from its position in the body 10.

In the body, instead of providing many small round holes for the passage of coffee infusion therethrough and which holes become easily clogged, I provide a plurality of elongated openings 22 through the body, for this purpose. As shown in Fig. 2, these openings are disposed radially in the body and they terminate at their outer ends short of the peripheral edge of the body and terminate at their inner ends short of the knob. These elongated openings are of a special cross sectional shape, in that each one of them is relatively narrow where it opens through the top surface of the body and is somewhat wider where it opens through the bottom surface of the body, as best shown in Fig. 3. These openings appear as slits in the top surface of the body and in practice they will be a trifle narrower than the diameter of the majority of the grains of the ground coffee used. Thus these openings prevent the passage of the coffee grains therethrough. Should some of the finer grains enter these openings, because of the flare of the sides of said openings toward the bottom of the body, they will pass through said openings instead of clogging them. Also, the openings are wide enough at the bottom as to prevent drops of coffee infusion from hanging onto the body so that the effective area of these openings is maintained. In case these openings do become clogged, they are easy to clean from the bottom of the body because of their wider bottom ends.

In Fig. 4, I have illustrated a modified arrangement for the elongated openings, which bear the reference numeral 22a. In this instance, these openings are disposed tangentially instead of radially, as in Fig. 2. This permits making said openings greater in length for the passage of a greater volume of coffee infusion therethrough without weakening the body of the disc.

In Fig. 1, 23 indicates a closure for the bottom end of the water compartment and which is so formed as to permit of the slow passage of hot water from the chamber 11 into the chamber 12. This closure member includes a disc-like body 24 having an annular bottom flange 25 that fits in the upper end of the chamber 12 and a radial marginal flange 26 adapted to rest upon the shoulder 13 before mentioned. On the top surface of the body 24 is a central upstanding knob 27, by which the member 23 may be grasped when placing it in or removing the same from its seating engagement on the shoulder 13. Extending through the body on a circle between the flange 25 and knob 27 is a plurality of relatively small openings 28. The parts of the member 26 are made to have such weight that it cannot be readily lifted off the flange 13 when the coffee in the compartment 12 swells in volume as it becomes saturated with the water dripping upon the same from the compartment 10. With the provision of the flange 25, such water as may tend to flow outwardly of the underside of the body 24, after passing through the openings 28, will follow downwardly along the inner surface of the flange 25 to drip directly upon the coffee in the chamber 12 instead of engaging with the inner surface of the chamber 12. Thus a better distribution of water is possible with respect to the coffee in the chamber 12. It is pointed out that only clean hot water passes through the openings 28 so that there is no tendency for said holes to clog. Therefore, the use of small holes, distinguished from elongated ones as the slots 22, is quite practical. It is preferred that the member 23 be made of the same material as the filter disc and to have the same glaze color so that the members 19 and 23 may be considered as a "set" of parts for use in a coffee maker.

In making a coffee infusion with a maker of the kind described, the filter disc 19 is placed in position in the member 10 so as to rest on the flange 14. Ground coffee grains are then poured into the member 10 through its open top end, up to the desired level in the chamber 12. The amount of such ground coffee is dependent upon the volume and strength desired in the resulting infusion.

Thereafter the member 23 is placed in position through the open top end of the chamber 11 so as to rest, as before described, upon the flange 13. In this respect it is pointed out that the diameter of the open top end of the chamber 11 is greater than that of either the members 23 and 19, to permit the easy placing and removal of said members. The desired amount of hot water is then poured into the chamber 11, through its open top end and if desired the cover or closure before mentioned, may now be applied thereto.

The hot water then trickles through the holes 28 to drop upon the ground coffee in the chamber 12. As the coffee absorbs the water, the coffee will swell up to its saturation point. Thereafter, the infusion produced as the water flows or percolates through the ground coffee passes through the openings 22 in the body of the member 19 to drop into the server. If a relatively large amount of coffee is employed in the chamber 12, its swelling might be such as to tend to "lift" the member 23 out of closure position on the flange so that some ground coffee might float into the chamber 11 to clog the openings 28. However, under such conditions, the weight of the member 23 is such as to amply resist the lifting thereof in the swelling of the coffee in the chamber 12 so that no ground coffee can float into the chamber 11 to thereafter clog the holes 28.

As the members 19 and 23 are made of a tasteless and odorless material unaffected by moisture, they will not become foul. However, they may be sterilized and cleaned by boiling water, without damage.

While in describing the invention, I have referred in detail to the form and arrangement of the parts shown, the same is to be considered only in the illustrative sense so that I do not wish to be limited thereto except as may be specifically set forth in the appended claims.

I claim as my invention:

1. A filter member for the bottom opening of the coffee chamber of a drip coffee maker comprising a generally flat circular body member of ceramic material having an imperforate circumferential support portion, a central imperforate portion of substantially greater thickness than the remainder of the body, said central portion serving to increase the strength of said member and as a handle therefor, the portion intermediate said central portion and said circumferential portion being provided with a plurality of spaced apart slits extending outwardly from said central portion, each slit having a relatively narrow top opening smaller than the average diameter of drip ground coffee and having a trapezoidal cross section sufficient to minimize capillary action and surface tension of liquid therein and to facilitate cleaning thereof, said slits being spaced apart a distance appreciably greater than the width of the bottom of said slits.

2. A filter member for the bottom opening of the coffee chamber of a drip coffee maker comprising a generally flat circular body member of glazed ceramic material having an imperforate circumferential support portion, a central imperforate portion of substantially greater thickness than the remainder of the body, said central portion serving to increase the strength of said member and as a handle therefor, the portion intermediate said central portion and said circumferential support portion being of substantially uniform thickness and being provided with a plurality of spaced apart slits extending outwardly from said central portion of said circumferential portion, each slit having a relatively narrow top opening smaller than the diameter of the majority of the particles of drip ground coffee and having a trapezoidal cross section sufficient to minimize capillary action and surface tension of liquid therein and to facilitate cleaning thereof, said slits being spaced apart a distance several times as great as the width of the bottom of said slits.

3. In combination, a filter member for the bottom opening of the coffee chamber of a drip coffee maker, said filter member comprising a generally flat circular body member of ceramic material having an imperforate circumferential support portion, a central imperforate portion of substantially greater thickness than the remainder of the body, said central portion serving to increase the strength of said member and as a handle therefor, the portion intermediate said central portion and said circumferential portion being provided with a plurality of spaced apart slits extending outwardly from said central portion, each slit having a relatively narrow top opening smaller than the average diameter of drip ground coffee and having a trapezoidal cross section sufficient to minimize capillary action and surface tension of liquid therein and to facilitate cleaning thereof, said slits being spaced apart a distance appreciably greater than the width of the bottom of said slits, and a distributor member disposed above the filter member, said distributor member having a multiplicity of small openings for distributing liquid over the filter member.

4. A filter member for the bottom opening of the coffee chamber of a drip coffee maker comprising a generally flat circular body member of molded non-metallic material having an imperforate circumferential support portion, a central imperforate portion of substantially greater thickness than the remainder of the body member, said central portion serving to increase the strength of said body member and as a handle therefor, the portion intermediate said central portion and said circumferential portion being provided with a plurality of spaced apart slits extending outwardly from said central portion, each slit having a relatively narrow top opening smaller than the average diameter of drip ground coffee and having a trapezoidal cross section sufficient to minimize capillary action and surface tension of liquid therein and to facilitate cleaning thereof, said slits being spaced apart a distance appreciably greater than the width of the bottom of the slits.

5. A filter member for the bottom opening of the ground coffee chamber of a drip coffee maker comprising a generally flat bottomed circular body member of molded non-metallic material having an imperforate circumferential support portion, a central imperforate portion of substantially greater thickness than the remainder of the body member, said central portion serving to increase the strength of said body member and as a handle therefor, the portion intermediate said central portion and said circumferential support portion, being of substantially uniform thickness and being provided with a plurality of spaced apart slits each having a relatively narrow top opening smaller than the average diameter of drip ground coffee particles and having a trapezoidal cross section sufficient to minimize capillary action and surface tension of liquid passing therethrough and to facilitate cleaning thereof, said slits being spaced apart a distance several times as great as the width of the bottom of said slits.

AMOS PETERSON.